United States Patent [19]
Wu et al.

[11] Patent Number: 6,017,840
[45] Date of Patent: Jan. 25, 2000

[54] HYDROTREATING CATALYST COMPOSITION AND PROCESSES THEREFOR AND THEREWITH

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 09/116,446

[22] Filed: Jul. 16, 1998

Related U.S. Application Data

[62] Division of application No. 08/791,426, Jan. 30, 1997, Pat. No. 5,866,744.

[51] Int. Cl.$^7$ .............................. B01J 29/04; B01J 29/06; B01J 29/18; B01J 21/16; C01G 35/06
[52] U.S. Cl. .............................. 502/60; 502/64; 502/78; 502/79; 502/81; 208/136
[58] Field of Search .................. 502/60, 64, 78, 502/79, 81; 208/136

[56] References Cited

U.S. PATENT DOCUMENTS

| | | | |
|---|---|---|---|
| 4,456,780 | 6/1984 | Young | 585/475 |
| 4,720,602 | 1/1988 | Chu | 585/407 |
| 4,849,568 | 7/1989 | McCullen et al. | 585/407 |
| 4,918,256 | 4/1990 | Nemet-Mavrodin | 585/415 |
| 4,983,274 | 1/1991 | Chen et al. | 208/111 |
| 5,053,374 | 10/1991 | Absil et al. | 502/64 |
| 5,580,540 | 12/1996 | Nakagawa | 423/718 |
| 5,603,821 | 2/1997 | Jossens et al. | 208/111 |
| 5,827,422 | 10/1998 | Drake et al. | 208/135 |
| 5,866,744 | 2/1999 | Wu et al. | 585/486 |

*Primary Examiner*—Gary P. Straub
*Assistant Examiner*—Cam N. Nguyen

[57] ABSTRACT

A catalyst composition and a process for converting a hydrocarbon stream such as, for example, a $C_9$+aromatic compound to $C_6$ to $C_8$ aromatic hydrocarbons such as xylenes are disclosed. The catalyst composition comprises an aluminosilicate, and a metal wherein the weight ratio of aluminum to silicon is in the range of from about 0.002:1 to about 0.6:1. The process comprises contacting a hydrocarbon stream with the catalyst composition under a condition sufficient to effect the conversion of a hydrocarbon to a $C_6$ to $C_8$ aromatic hydrocarbon. Also disclosed is a process for producing the catalyst composition which comprises: (1) optionally contacting a beta zeolite with steam to produce a steamed beta zeolite; (2) contacting a beta zeolite or the steamed beta zeolite with an effective amount of an acid under a condition sufficient to effect a reduction in aluminum content of the beta zeolite to produce an acid-leached beta zeolite; and (3) impregnating the acid-leached beta zeolite with an effective amount of a metal compound under a condition sufficient to effect the production of a metal-promoted beta zeolite.

22 Claims, No Drawings

HYDROTREATING CATALYST COMPOSITION AND PROCESSES THEREFOR AND THEREWITH

This application is a division of application Ser. No. 08/791,426, filed Jan. 30, 1997 now U.S. Pat. No. 5,866,744, abandoned.

FIELD OF THE INVENTION

This invention relates to a catalyst composition useful for converting a hydrocarbon to a $C_6$ to $C_8$ aromatic hydrocarbon, to a process for producing the composition, and to a process for using the composition for converting a hydrocarbon to a $C_6$ to $C_8$ aromatic hydrocarbon.

BACKGROUND OF THE INVENTION

It is well known to those skilled in the art that aromatic hydrocarbons are a class of very important industrial chemicals which find a variety of uses in petrochemical industry. It is also well known to those skilled in the art that catalytically cracking gasoline-range hydrocarbons produces aromatic hydrocarbons such as, for example, benzene, toluene, and xylenes (hereinafter collectively referred to as BTX) in the presence of catalysts which contain a zeolite. The product of this catalytic cracking process contains a multitude of hydrocarbons including unconverted $C_5$+alkanes, $C_5$+alkenes, $C_5$+cycloalkanes, or combinations of two or more thereof, lower alkanes such as methane, ethane, and propane; lower alkenes such as ethylene and propylene; and $C_9$+aromatic compounds having 9 or more carbon atoms per molecule. Recent efforts to convert gasoline to more valuable petrochemical products have focused on improving the conversion of gasoline to more valuable aromatic hydrocarbons in the presence of zeolite catalysts. For example, a gallium-promoted zeolite ZSM-5 has been used in the so-called Cyclar Process to convert a hydrocarbon to BTX. The aromatic hydrocarbons can be useful feedstocks for producing various organic compounds and polymers. However, heavier, less useful aromatic compounds having 9 or more carbon atoms per molecule ($C_9$+ aromatic compounds) are also produced by the conversion process. Furthermore, a zeolite catalyst is generally deactivated in a rather short period, especially in a high sulfur and/or polyaromatics environment, because of depositions of carbonaceous material, generally coke, on the surface of the catalyst. Therefore, development of a catalyst and a process for converting a $C_9$+aromatic compound to the more valuable BTX in which the process and catalyst reduce the depositions of the carbonaceous material would be a significant contribution to the art and to the economy.

SUMMARY OF THE INVENTION

An object of this invention is to provide a catalyst composition which can be used to convert a hydrocarbon to a $C_6$ to $C_8$ aromatic hydrocarbon. Also an object of this invention is to provide a process for producing the catalyst composition. Another object of this invention is to provide a process which can employ the catalyst composition to convert a hydrocarbon to a $C_6$ to $C_8$ aromatic hydrocarbon. An advantage of the catalyst composition is that it enhances the production of BTX and suppresses the deposition of coke thereon. Other objects and advantages will becomes more apparent as this invention is more fully disclosed hereinbelow.

According to a first embodiment of the present invention, a composition which can be used as a catalyst for converting a hydrocarbon or a hydrocarbon mixture to a $C_6$ to $C_8$ aromatic hydrocarbon is provided. The composition comprises, consists essentially of, or consists of, a crystalline aluminosilicate and a metal selected from the group consisting of nickel, palladium, molybdenum, gallium, platinum, copper, chromium, rhodium, rhenium, tungsten, cobalt, germanium, zirconium, titanium, ruthenium, and combinations of any two or more thereof.

According to a second embodiment of the present invention, a process which can be used for producing a catalyst composition is provided. The process comprises the steps: (1) contacting a zeolite, which comprises, consists essentially of, or consists of, silicon, aluminum, and oxygen, with steam, under a condition sufficient to effect the production of a zeolite having a reduced coking rate in a transalkylation process, whereby a steamed zeolite is formed; (2) optionally, contacting said steamed zeolite with an acid in an amount and under a condition effective to reduce the aluminum content of the zeolite to produce an acid-leached zeolite; (3) contacting the steamed zeolite or the acid-leached zeolite with a metal compound whose metal is selected from the group consisting of nickel, palladium, molybdenum, gallium, platinum, tin, chromium, rhodium, rhenium, tungsten, indium, cobalt, germanium, zirconium, titanium, ruthenium, and combinations of any two or more thereof under a condition effective to incorporate the metal compound or the metal into the steamed zeolite or the acid-leached zeolite to produce a metal-incorporated zeolite; and (4) optionally treating the metal-incorporated zeolite with a reducing agent under a condition effective to lower the oxidation state of the metal in the metal-promoted zeolite.

According to a third embodiment of the present invention, a process, which can be used for converting a hydrocarbon or a hydrocarbon mixture to a $C_6$ to $C_8$ aromatic hydrocarbon and for reducing the deposition of carbonaceous material on the surface of a catalyst is provided which comprises, consists essentially of, or consists of, contacting a fluid which comprises a hydrocarbon or a hydrocarbon mixture with a catalyst composition which can be the same as disclosed above in the first embodiment and can be made by the process disclosed above in the second embodiment of the invention under a condition effective to convert a hydrocarbon to an aromatic hydrocarbon containing 6 to 8 carbon atoms per molecule.

DETAILED DESCRIPTION OF THE INVENTION

The catalyst composition of the first embodiment of the present invention comprises a crystalline aluminosilicate and a metal selected from the group consisting of nickel, palladium, molybdenum, gallium, platinum, chromium, rhodium, rhenium, tungsten, cobalt, germanium, zirconium, titanium, ruthenium, and combinations of any two or more thereof. The metal can be, and generally is chemically bonded to oxygen or sulfur.

According to the present invention, the term "coke" refers to a semi-pure carbon generally deposited on the surface of a metal wall or a catalyst. The term "hydrocarbon" generally has the formula of $RH_z$ in which R is a hydrocarbyl radical having 1 to about 30, preferably 5 to about 25, and most preferably 9 to 16 carbon atoms per molecule; z is a number that fills the necessary valency of R; and the hydrocarbyl radicals can be alkyl radical, aryl radical, alkaryl radical, aralkyl radical, or combinations of any two or more thereof and can be substituted or unsubstituted.

The weight ratio of aluminum to silicon of the crystalline aluminosilicate can be any ratio that is effective to convert a hydrocarbon to an aromatic hydrocarbon. Generally, the weight ratio of element aluminum to element silicon can be in the range of from about 0.002:1 to about 0.6:1, preferably about 0.005:1 to about 0.5:1, and most preferably 0.006:1 to 0.4:1. The weight ratio of the incorporated metal to element silicon can be any ratio that can enhance the conversion of a hydrocarbon to a BTX and can be in the range of from about 0.0001:1 to about 0.1:1, preferably about 0.0005:1 to about 0.05:1, more preferably about 0.001:1 to about 0.04:1, and most preferably 0.002:1 to 0.03:1.

Alternatively, the weight of element aluminum in the invention composition can be in the range of from about 0.1 to about 20, preferably about 0.5 to about 15, and most preferably 0.5 to 10 grams per 100 grams of the composition. The weight of element silicon in the invention composition can be in the range of from about 10 to about 50, preferably about 15 to about 40, and most preferably 20 to 40 grams per 100 grams of the composition. The weight of the incorporated metal can be such that is effective to enhance the conversion of a hydrocarbon to BTX and can be in the range of from about 0.001 to about 15, preferably about 0.01 to about 10, and most preferably 0.1 to 5 grams per 100 grams of the composition. The composition can also be characterized by having the following physical characteristics: a micropore surface area, as determined by the BET method using nitrogen, in the range of from about 50 to about 1,000, preferably to 500 $m^2/g$; a micropore pore volume in the range of from about 0.1 to about 2.0, preferably about 0.1 to about 1.0 ml/g; an average micropore pore diameter in the range of from about 0.1 to about 500, preferably about 1 to about 200 Å; and a porosity of more than about 20%.

The aluminosilicate or zeolite component of the composition of the present invention can be prepared by combining any alumina and any silica in the element weight ratios disclosed above under any conditions sufficient to effect the formation of a zeolite according to any methods well known to one skilled in the art. However, it is presently preferred that the composition of the present invention be produced by the process disclosed in the second embodiment of the invention.

Any commercially available zeolites can be employed as a starting material of the process of the second embodiment of the invention. Examples of suitable zeolites include, but are not limited to, those disclosed in Kirk-Othmer Encyclopedia of Chemical Technology, third edition, volume 15 (John Wiley & Sons, New York, 1991). The presently preferred zeolite is a beta zeolite, especially one having a framework topology identified as BEA because it is highly acidic and shape-selective.

According to the second embodiment of the invention, a zeolite, preferably a beta zeolite, can be optionally contacted with one or more suitable binders in a liquid, preferably aqueous medium, to form a zeolite-binder mixture. Any binders known to one skilled in the art for use with a zeolite are suitable for use herein. Examples of suitable binder include, but are not limited to, clays such as for example, kaolinite, halloysite, vermiculite, chlorite, attapulgite, smectite, montmorillonite, illite, saconite, sepiolite, palygorskite, diatomaceous earth, and combinations of any two or more thereof; aluminas such as for example α-alumina and γ-alumina; silicas; alumina-silica; aluminum phosphate; aluminum chlorohydrate; and combinations of any two or more thereof. Because these binders are well known to one skilled in the art, description of which is omitted herein. The weight ratio of a zeolite to a binder can be in a wide range and generally in the range of from about 200:1 to about 0.1:1, preferably 100:1 to 0.01:1.

The zeolite and the binder can be well mixed by any means known to one skilled in the art such as stirring, blending, kneading, or extrusion, following which the zeolite-binder mixture can be dried in air at a temperature in the range of from about 20 to about 200° C., preferably about 25 to about 175° C., and most preferably 25 to 150° C. for about 0.5 to about 50 hours, preferably about 1 to about 30 hours, and most preferably 1 to 20 hours, preferably under atmospheric pressure. Thereafter, the dried, zeolite-binder mixture can be further calcined, if desired, in air at a temperature in the range of from about 300 to 1000° C., preferably about 350 to about 750° C., and most preferably 450 to 650° C. to prepare a calcined zeolite-binder. If a binder is not desired, a zeolite can also be calcined under similar conditions to remove any contaminants, if present.

A zeolite, a calcined zeolite, or a calcined zeolite-binder can be treated with a compound containing an exchangeable ammonium ion to prepare an ammonium-exchanged zeolite. Whether a zeolite is calcined or contains a binder, the process or treatment in the second embodiment is the same for each. For the interest of brevity, only a zeolite is described hereinbelow. Examples of suitable ammonium-containing compounds include, but are not limited to, ammonium sulfate, ammonium chloride, ammonium nitrate, ammonium bromide, ammonium fluoride, and combinations of any two or more thereof. Treatment of the zeolite replaces the original ions such as, for example, alkali or alkaline earth metal ions of the zeolite with predominantly ammonium ions. Techniques for such treatment are well known to one skilled in the art such as, for example, ion exchange with the original ions. For example, a zeolite can be contacted with a solution containing a salt of the desired replacing ion or ions.

Generally, a zeolite can be suspended in an aqueous solution of an ammonium-containing compound. The concentration of the zeolite in the aqueous solution can be in the range of from about 0.01 to about 200, preferably about 0.1 to about 150, more preferably about 1 to about 100, and most preferably 5 to 75 grams per liter. The amount of the ammonium-containing compound required depends on the amount of the original ion(s) to be exchanged. Upon the preparation of the solution, the solution can be subject to a temperature in the range of from about 30° C. to about 200° C., preferably about 40° C. to about 150° C., and most preferably 50° C. to 125° C. for about 1 to about 100 hours, preferably about 1 to about 50 hours, and most preferably 2 to 25 hours depending on desired degrees of ion exchange. The treatment can be carried out under a pressure in the range of from about 1 to about 10 atmospheres (atm), preferably about 1 atm or any pressure that can maintain the required temperature. Thereafter, the treated zeolite can be washed with running water for 1 to about 60 minutes followed by drying and calcining to produce calcined zeolite. The drying and calcining processes can be carried out substantially the same as those disclosed above for the preparation of a calcined zeolite or zeolite-binder.

Generally, the ammonium-exchanged zeolite becomes hydrogen exchanged upon calcination or high temperature treatment such that a predominant proportion of its exchangeable cations are hydrogen ions. The above-described ion exchanges of exchangeable ions in a zeolite is well known to one skilled in the art. See, for example, U.S. Pat. No. 5,516,956, disclosure of which is incorporated herein by reference. Because the ion exchange procedure is well known, the description of which is omitted herein for the interest of brevity.

In the first step of the second embodiment of the invention, a zeolite in a desired ionic form, regardless whether calcined or containing a binder, can be contacted with steam under a condition sufficient to effect the formation of steamed zeolite. Generally the steam temperature can be in the range of from about 120° C. to about 1500° C., preferably about 200° C. to about 1000° C., more preferably 250° C. to 800° C., and most preferably 350 to 625° C. The contact period can be as short as 5 minutes to as long as about 30 hours, preferably about 30 minutes to 20 hours, and most preferably 1 hour to 10 hours. The treatment can be carried out under a pressure that can maintain or accommodate the steam temperature in the range of from about atmospheric pressure to about 2,000, preferably to about 1,500, and most preferably to 1000 psig.

Upon completion of steam treatment, a steamed zeolite is formed which can be treated with an acid. Generally, any organic acids, inorganic acids, or combinations of any two or more thereof can be used in the process of the present invention so long as the acid can reduce the aluminum content in the zeolite. The acid can also be a diluted aqueous acid solution. Examples of suitable acids include, but are not limited to sulfuric acid, hydrochloric acid, nitric acid, phosphoric acid, formic acid, acetic acid, trifluoroacetic acid, trichloroacetic acid, p-toluenesulfonic acid, methanesulfonic acid, partially neutralized acids wherein one or more protons have been replaced with, for example, a metal (preferably an alkali metal) or ammonium ion, and combinations of any two or more thereof. Examples of partially neutralized acids include, but are not limited to, sodium bisulfate, sodium dihydrogen phosphate, potassium hydrogen tartarate, ammonium sulfate, ammonium chloride, ammonium nitrate, and combinations thereof. The presently preferred acids are hydrochloric acid and nitric acid for they are readily available.

Any methods known to one skilled in the art for treating a solid catalyst with an acid can be used in the acid treatment of the present invention. Generally, a zeolite material can be suspended in an acid solution. The concentration of the zeolite in the acid solution can be in the range of from about 0.01 to about 500, preferably about 0.1 to about 400, more preferably about 1 to about 350, and most preferably 5 to 300 grams per liter. The amount of acid required is the amount that can maintain the solution in acidic pH during the treatment. Preferably the initial pH of the acid solution containing a zeolite is adjusted to lower than about 6, preferably lower than about 5, more preferably lower than about 4, and most preferably lower than 3. Upon the pH adjustment of the solution, the solution can be subjected to a treatment at a temperature in the range of from about 30° C. to about 200° C., preferably about 50° C. to about 150° C., and most preferably 70° C. to 120° C. for about 10 minutes to about 30 hours, preferably about 20 minutes to about 25 hours, and most preferably 30 minutes to 20 hours. The treatment can be carried out under a pressure in the range of from about 1 to about 10 atmospheres (atm), preferably about 1 atm so long as the desired temperature can be maintained. Thereafter, the acid-treated zeolite material can be washed with running water for 1 to about 60 minutes followed by drying, at about 50 to about 1000, preferably about 75 to about 750, and most preferably 100 to 650° C. for about 0.5 to about 15, preferably about 1 to about 12, and most preferably 1 to 10 hours, to produce an acid-leached zeolite. Any drying method known to one skilled in the art such as, for example, air drying, heat drying, spray drying, fluidized bed drying, or combinations of two or more thereof can be used.

The dried, acid-leached zeolite can also be further washed, if desired, with a mild acid solution such as, for example, ammonium nitrate which is capable of maintaining the pH of the wash solution in acidic range. The volume of the acid generally can be the same volume as the acid for reducing the alumina content in a zeolite. The mild acid treatment can be carried out under substantially the same conditions disclosed in the acid treatment for reducing alumina content in a zeolite. Thereafter, the resulting solid can be washed and dried as disclosed above.

The dried, acid-leached zeolite, whether it has been further washed with a mild acid or not, can be calcined, if desired, under a condition known to those skilled in the art. Generally such a condition can include a temperature in the range of from about 250 to about 1,000, preferably about 350 to about 750, and most preferably 450 to 650° C. and a pressure in the range of from about 0.5 to about 50, preferably about 0.5 to about 30, and most preferably 0.5 to 10 atmospheres (atm) for about 1 to about 30 hours, preferably about 2 to about 20 hours, and most preferably 3 to 15 hours.

Thereafter, the steamed zeolite or acid-leached zeolite, whether it has been calcined or not, can be incorporated therein or impregnated thereon with a metal compound whose a metal selected from the group consisting of nickel, palladium, molybdenum, gallium, platinum, tin, chromium, rhodium, rhenium, tungsten, indium, cobalt, germanium, zirconium, titanium, ruthenium, and combinations of any two or more thereof. Any metal compound that can promote the incorporating or impregnating of the acid-leached zeolite with the metal of the metal compound can be employed in the present invention.

Generally, any platinum-containing compound that can promote the combining of platinum element with an aluminosilicate can be employed herein. Examples of suitable platinum-containing compounds include, but are not limited to, chloroplatinic acid ($H_2PtCl_6 \cdot xH_2O$), platinum (IV) chloride (platinic chloride), platinum (II) bromide, platinum (II) iodine, tetramine platinum (II) chloride ($Pt(NH_3)_4Cl_2 \cdot H_2O$ or $Pt(NH_3)_4Cl_2$), tetramine platinum (II) nitrate ($Pt(NH_3)_4(NO_3)_2$), tetramine platinum (II) hydroxide ($Pt(NH_3)_4(OH)_2$), tetrachlorodiamine platinum (IV), and combinations of any two or more thereof. The presently preferred platinum-containing compound is chloroplatinic acid for it is readily available.

Similarly, examples of suitable tin-containing compound include, but are not limited to, stannous acetate, stannic acetate, stannous bromide, stannic bromide, stannous chloride, stannic chloride, stannous oxalate, stannous sulfate, stannic sulfate, stannous sulfide, and combinations of any two or more thereof.

Examples of suitable titanium-containing compounds include, but are not limited to, zinc titanate, lanthanum titanate, titanium tetramides, titanium tetramercaptides, titanium tetrabutoxide, titanium tetramethoxides, titanium tetraethoxide, titanium tetrapropoxide, titanium tetrachloride, titanium trichloride, titanium bromides, and combinations of any two or more thereof.

Similarly, examples of suitable zirconium-containing compounds include, but are not limited to, zirconium acetate, zirconium formate, zirconium chloride, zirconium bromide, zirconium butoxide, zirconium tert-butoxide, zirconium citrate, zirconium ethoxide, zirconium methoxide, zirconium propoxide, and combinations of any two or more thereof.

Examples of suitable germanium-containing compounds include, but are not limited to, germanium chloride, germanium bromide, germanium ethoxide, germanium fluoride, germanium iodide, germanium methoxide, and combinations of any two or more thereof.

Examples of suitable indium-containing compounds include, but are not limited to indium acetate, indium bromide, indium chloride, indium fluoride, indium iodide, indium nitrate, indium phosphide, indium selenide, indium sulfate, and combinations of any two or more thereof.

Examples of suitable lanthanum-containing compounds include, but are not limited to, lanthanum acetate, lanthanum carbonate, lanthanum octanoate, lanthanum fluoride, lanthanum chloride, lanthanum bromide, lanthanum iodide, lanthanum nitrate, lanthanum perchlorate, lanthanum sulfate, lanthanum titanate, and combinations of any two or more thereof.

Examples of other suitable metal compounds include, but are not limited to, molybdenum(II) acetate, ammonium molybdate, ammonium dimolybdate, ammonium heptamolybdate, phosphomolybdic acid, molybdenum(III) bromide, molybdenum(II) chloride, molybdenum(IV) chloride, molybdenum(V) chloride, molybdenum hexacarbonyl, molybdenum(IV) sulfide, sodium molybdate, potassium molybdate, molybdenum oxychloride, molybdenum fluoride, molybdenum(VI) tetrachloride oxide, ammonium tetrathiomolybdate, chromium(II) acetate, chromium (III) acetate, chromium(III) acetylacetonate, chromium(II) chloride, chromium(III) chloride, chromium(II) fluoride, chromium(III) fluoride, chromium hexacarbonyl, chromium (III) nitrate, chromium nitride, chromium(III) 2,4-pentanedionate, chromium(III) perchlorate, chromium(III) potassium sulfate, chromium(III) sulfate, chromium(III) telluride, cobalt(II) acetate, cobalt(II) acetylacetonate, cobalt(III) acetylacetonate, cobalt(II) benzoylacetonate, cobalt(II) bromide, cobalt(II) carbonate, cobalt(II) chloride, cobalt(II) 2-ethylhexanoate, cobalt(II) fluoride, cobalt(III) fluoride, cobalt(II) iodide, cobalt(II) iodide, cobalt(II) 2,3-naphthalocyanine, cobalt(II) nitrate, cobalt(II) oxalate, cobalt(II) perchlorate, cobalt(II) phthalocyanine, cobalt(II) sulfate, cobalt(II) thiocyanate, cobalt(II) tungstate, nickel(II) acetate, nickel(II) acetylacetonate, nickel(II) bromide, nickel(II) carbonate, nickel(II) chloride, nickel(II) nitrate, nickel(II) perchlorate, nickel phosphide, nickel(II) sulfate, nickel sulfide, nickel(II) titanate, palladium(II) acetate, palladium(II) acetylacetonate, palladium(II) bromide, palladium(II) iodide, palladium(II) nitrate, palladium(II) sulfate, palladium(II) sulfide, rhodium(II) acetate, rhodium (III) acetylacetonate, rhodium(III) bromide, rhodium(III) chloride, rhodium(III) nitrate, rhodium(II) octanoate, rhodium(III) phosphate, rhodium(III) sulfate, rhenium nitrate, rhenium sulfate, tungsten(V) bromide, tungsten(IV) chloride, tungsten(VI) chloride, tungsten hexacarbonyl, tungsten(VI) oxychloride, tungsten(IV) sulfide, tungstic acid, and combinations of any two or more thereof.

The presently preferred metal compound is an ammonium molybdate for it is readily available and effective for incorporating Mo into a zeolite.

A metal-promoted or metal-impregnated zeolite can be prepared by any suitable, effective means so long as the resulting zeolite can be used in the process of the present invention. Preferably, a zeolite or acid-leached zeolite, which can have been compounded with a binder as described above and have been shaped by any means known in the art such as, for example, pelletized, extruded, tableted, or combinations of two or more thereof, can be impregnated such as, for example, by incipient wetness method with a solution, preferably aqueous solution, containing a suitable metal compound disclosed above under a condition well known to one skilled in the art such as, for example, at about 25° C. for about 1 minute to about 10 hours under atmospheric pressure. The concentrations of the metal compound in the impregnating solution and the weight ratio of this solution to the zeolite are chosen such as to provide a finished, metal-impregnated, acid-leached zeolite which contains the desired content of metal which can effect the reduction of coke deposition on the surface of the composition of the present invention as disclosed above in the first embodiment of the present invention. Because the impregnation process is well known to one skilled in the art, the description of which is omitted herein.

After the incorporation or impregnation with a metal compound has been completed, the metal-impregnated zeolite can then be dried, as disclosed above and then calcined. Generally the calcination is carried out in air under the pressure range disclosed above for calcining the acid-leached zeolite. The calcination can also be carried out at a temperature in the range of about 300 to about 1000° C. for about 1 to about 30 hours, preferably about 400° C. to about 800° C. for 1 to about 20 hours, and most preferably 450° C. to 650° C. for 2 to 15 hours.

The calcined, metal-impregnated zeolite can then be treated with a reducing agent to reduce the oxidation state of the metal. For example, if the metal is platinum, the oxidation state of platinum can be reduced to 0. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 550° C. for 1 to 5 hours. If the calcined, metal-impregnated zeolite is not first treated with a reducing agent, the composition of the present invention can be treated with a reducing agent as described herein prior to use of the composition of the invention.

Upon completion of the above-described treatment or impregnation of an acid-leached zeolite with a metal compound, a metal-promoted zeolite composition is produced which can then be used in the third embodiment of the present invention.

According to the third embodiment of the present invention, a process useful for converting a hydrocarbon, preferably a $C_9$+aromatic compound, to a mixture rich in $C_6$ to $C_8$ aromatic hydrocarbons comprises, consists essentially of, or consists of contacting a fluid stream with a catalyst composition, optionally in the presence of an inert gas or a hydrogen-containing fluid, under a condition sufficient to enhance or effect the conversion of a hydrocarbon to a mixture rich in $C_6$ to $C_8$ aromatic hydrocarbons wherein said fluid stream comprises a hydrocarbon or hydrocarbon mixture which can comprise $C_9$+aromatic compounds, paraffins, olefins, naphthenes. The catalyst composition is the same as that disclosed in the first embodiment of the invention which can be prepared by the second embodiment of the invention.

The term "fluid" is used herein to denote gas, liquid, vapor, or combinations thereof. The term "enhance" refers to an increased BTX in the product employing the catalyst composition as compared to employing an untreated zeolite. Examples of a hydrocarbon include, but are not limited to, butane, isobutanes, pentane, isopentanes, hexane, isohexanes, cyclohexane, methylcyclohexane, heptane, isoheptanes, octane, isooctanes, nonanes, decanes, undecanes, dodecanes, tridecanes, tetradecanes, pentadecanes, hexadecanes, butenes, isobutene, pentenes, hexenes, 1,2,3-trimethylbenzene, 1,2,4-trimethylbenzene, 1,3,5-trimethylbenzene, 1,2,3,4-tetramethylbenzene, 1,2,3,5-tetramethylbenzene, 1,2,4,5-tetramethylbenzene, n-propylbenzene, 3-ethyltoluene, 4-ethyltoluene, 3-n-propyltoluene, 4-n-propyltoluene, 1,3-diethylbenzene, naphthalenes, and combinations of any two or more thereof. In some feed fluids, such as, for example, gasoline can comprise some benzene, toluene, ethylbenzene, and xylenes.

Any fluid which contains a $C_9$+aromatic compound can be used as the feed for the process of this invention. Generally, the fluid feed stream can also contain olefins, naphthenes (cycloalkanes), or some aromatic compounds. Examples of suitable, available fluid feeds include, but are not limited to, gasolines from catalytic oil cracking processes, pyrolysis gasolines from thermal cracking of saturated hydrocarbons, naphthas, gas oils, reformates, and combinations of any two or more thereof. The origin of this fluid feed is not critical. Though particular composition of a feed is not critical, a preferred fluid feed is derived from gasolines which generally contain more paraffins (alkanes) than combined content of olefins, cycloalkanes, and aromatic compounds.

Any fluid which contains a $C_9$+aromatic compound as disclosed above can also be used as the feed for the process of this invention. A $C_9$+aromatic compound can have the formula of $R'_qAr$ wherein each $R'$ is a hydrocarbyl radical having 1 to about 15 carbon atoms and is independently selected from the group consisting of alkyl radicals, aryl radicals, alkaryl radicals, aralkyl radicals, alkenyl radicals, and combinations of any two or more thereof, q is a whole number from 1 to 5, and Ar is a phenyl group. The origin of the $C_9$+aromatic compounds feed is not critical. However, a preferred fluid feed is a $C_9$+aromatic compound derived from the heavies fraction of a product from a paraffin, in particular gasoline, aromatization reaction. Generally, this heavies fraction contains primarily trimethylbenzenes such as 1,2,3-trimethylbenzene, 1,2,4-trimethylbenzene, and 1,3,5-trimethylbenzene; tetramethylbenzenes such as 1,2,3,4-tetramethylbenzene, 1,2,3,5-tetramethylbenzene and 1,2,4,5-tetramethylbenzene; and naphthalenes. Additionally, n-propylbenzene, 3-ethyltoluene, 4-ethyltoluene, 3-n-propyltoluene, 4-n-propyltoluene, and 1,3-diethylbenzene can also be present in the fluid.

In a hydrodealkylation process benzene, toluene, ethylbenzene and xylenes are generally substantially absent from the fluid, i.e., the amount of each of these aromatic hydrocarbons is less than about 0.1 weight % in the fluid. However, in a transalkylation process, one or more of benzene, toluene, ethylbenzene and xylenes can be present in the feed to effect a significant alkylation of the lower aromatic hydrocarbons by the $C_9$+aromatic compounds, i.e., significant transalkylation occurs. The condition for carrying out hydrodealkylation and transalkylation can be substantially the same as disclosed hereinbelow.

Any hydrogen-containing fluid which comprises, consists essentially of, or consists of, molecular hydrogen ($H_2$) can be used in the process of this invention. This hydrogen-containing fluid can therefore contain $H_2$ in the range of from about 1 to about 100, preferably about 5 to about 100, and most preferably 10 to 100 volume %. If the $H_2$ content in the fluid is less than 100%, the remainder of the fluid may be any inert gas such as, for example, $N_2$, He, Ne, Ar, steam, or combinations of any two or more thereof, or any other fluid which does not significantly affect the process or the catalyst composition used therein.

The contacting of a fluid feed stream containing a hydrocarbon with a hydrogen-containing fluid in the presence of the catalyst composition can be carried out in any technically suitable manner, in a batch or semicontinuous or continuous process, under a condition effective to convert a hydrocarbon to a $C_6$ to $C_8$ aromatic hydrocarbon. Generally, a fluid stream as disclosed above, preferably being in the vaporized state, is introduced into a suitable hydroprocessing reactor having a fixed catalyst bed, or a moving catalyst bed, or a fluidized catalyst bed, or combinations of any two or more thereof by any means known to one skilled in the art such as, for example, pressure, meter pump, and other similar means. Because a hydroprocessing reactor and process therewith are well known to one skilled in the art, the description of which is omitted herein for the interest of brevity. The condition of the process of the invention can include a weight hourly space velocity of the fluid feed stream in the range of about 0.01 to about 100, preferably about 0.05 to about 50, and most preferably 0.1 to 30 g feed/g catalyst/hour. The hydrogen-containing fluid (gas) hourly space velocity generally is in the range of about 1 to about 10,000, preferably about 5 to about 7,000, and most preferably 10 to 10,000 $ft^3$ $H_2/ft^3$ catalyst/hour. Generally, the pressure can be in the range of from about 10 to about 2000 psig, preferably about 100 to about 1000 psig, and most preferably 200 to 750 psig, and the temperature is about 250 to about 1000° C., preferably about 300 to about 750° C., and most preferably 400 to 650° C.

The process effluent generally contains a light gas fraction comprising hydrogen and methane; a $C_2$–$C_3$ fraction containing ethylene, propylene, ethane, and propane; an intermediate fraction including non-aromatic compounds having greater than 3 carbon atoms; a BTX aromatic hydrocarbons fraction (benzene, toluene, ortho-xylene, meta-xylene and para-xylene); and a $C_9$+fraction which contains aromatic compounds having 9 or more carbon atoms per molecule. Generally, the effluent can be separated into these principal fractions by any known methods such as, for example, fractionation distillation. Because the separation methods are well known to one skilled in the art, the description of which is omitted herein. The intermediate fraction can be fed to an aromatization reactor to be converted to aromatic hydrocarbons; methane, ethane, and propane can be used as fuel gas or as a feed for other reactions such as, for example, in a thermal cracking process to produce ethylene and propylene. The olefins can be recovered and further separated into individual olefins by any method known to one skilled in the art. The individual olefins can then be recovered and marketed. The BTX fraction can be further separated into individual $C_6$ to $C_8$ aromatic hydrocarbon fractions. Alternatively, the BTX fraction can further undergo one or more reactions either before or after separation to individual $C_6$ to $C_8$ hydrocarbons so as to increase the content of the most desired BTX aromatic hydrocarbon. Suitable examples of such subsequent $C_6$ to $C_8$ aromatic hydrocarbon conversions are disproportionation of toluene (to form benzene and xylenes), transalkylation of benzene and xylenes (to form toluene), and isomerization of meta-xylene and/or ortho-xylene to para-xylene.

After the catalyst composition has been deactivated by, for example, coke deposition or feed poisons, to an extent that the feed conversion and/or the selectivity to the desired ratios of olefins to BTX have become unsatisfactory, the catalyst composition can be reactivated by any means known to one skilled in the art such as, for example, calcining in air to burn off deposited coke and other carbonaceous materials, such as oligomers or polymers, preferably at a temperature of about 400 to about 1000° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention and are not to be construed as unduly limiting the scope of the present invention.

EXAMPLE I

This example illustrates the effect of the treatment of a beta zeolite material with steam essentially according to the second embodiment of the invention.

A commercial beta zeolite BEA, which was provided by UOP (Des Plains, Ill.) as 1/16 inch extrudes, was used in the Examples. This material (10 g) was impregnated with an ammonium molybdate solution containing 0.375 g ammonium molybdate $((NH_4)_6MO_7O_{24} \cdot 4H_2O)$ and 6 g $H_2O$ by the well known incipient wetness method at about 25 ° C. The ammonium molybdate-impregnated beta zeolite was then calcined in air (muffle furnace) for 6 hours at 538° C. to produce 10.01 g of catalyst A containing 2.036 weight % molybdenum by calculation.

In a separate run, 33.50 g of the commercial beta zeolite treated with 100 ml of an aqueous 6N HCl solution (i.e., an aqueous solution containing 6 g-equivalents of hydrochloric acid) for 1 hour at 94° C. The mixture of acid-treated beta zeolite material and HCl solution was filtered, washed with running water for about 30 minutes and then heated at 525 ° C. for 6 hours to produce 22.75 g of an acid-leached beta zeolite. The acid-leached beta zeolite (5.01 g) was then impregnated with a solution containing 5.22 g of 6 weight % ammonium heptamolybdate $((NH_4)_6MO_7O_{24} \cdot 4H_2O)$ solution by the well-known incipient wetness method described above. The impregnated beta zeolite was calcined in air for 6 hours at 538° C. to produce 5.07 g Mo-promoted, acid-leached beta zeolite (catalyst B) containing 3.357 weight % Mo by calculation.

Catalyst C was obtained by first heating 33.50 g of beta zeolite with steam at 425° C. for 2 hours to produce a steamed zeolite. The steamed zeolite, upon being cooled with a helium flow to 25° C., was treated with 1N $HNO_3$ for 2 hours at 95° C. followed by drying in air at 525° C. for 6 hours to produce 31.32 g of a steamed, acid-leached beta zeolite. Thereafter, 6.65 g of the acid-leached beta zeolite was impregnated with 4.23 g of a 6 weight % ammonium heptamolybdate solution followed by air calcining at 538° C. for 6 hours to produce a product weighing 6.47 g and contained 2.132 weight % molybdenum by calculation.

EXAMPLE II

This example illustrates the use of the zeolite materials (catalysts A, B, and C) described in Example I in the transalklylation of a feed comprising $C_9$+aromatic compounds and toluene to produce a product containing a higher concentration of BTX than the feed. The composition of aromatic compounds, up to 12 carbon atoms per molecule, of the feed used for the transalkylation is shown in Table I. There were numerous unidentified components in the feed that are not shown in the calculation disclosed in Table I.

TABLE I

| Composition | | Weight % |
|---|---|---|
| Paraffins | | 2.032 |
| i-Paraffins | | 9.255 |
| Naphthenes | | 1.267 |
| | Total | |
| Aromatics | $C_6$ | 0.000 |
| | $C_7$ | 50.248 |
| | $C_8$ | 0.411 |
| | $C_9$ | 11.315 |
| | $C_{10}$ | 12.664 |
| | $C_{11}$ | 9.457 |
| | $C_{12}$ | 3.001 |
| | Total | 87.096 |
| Sulfur (ppmw) | | 658 |

A stainless-steel reactor tube (inner diameter: 2.5 cm; length: 50 cm) was filled with a 20 cm bottom layer of Alundum® alumina (inert, low surface area alumina, provided by Norton Company, Worcester, Mass.), 5 ml of one of the zeolite materials described in Example I, and a 20 cm top layer of Alundum®. The reactor and its content were pre-heated from room temperature to the desired reaction temperature of about 575° C. The zeolite materials (catalysts) were pretreated with flowing hydrogen gas at a rate of 260 ml per minute at 500° C. starting at 25° C. and ramping at 10° C./min. The reaction pressure was set at 500 psig. A liquid feed as shown in Table I was introduced into the heated reactor at a rate of 20 ml/hour, which was equivalent to a hourly space velocity of about 5.6 ml/ml catalyst/hour. The product, which exited the reactor, was cooled, analyzed by means of an online gas chromatograph at intervals of about 1 hour. Pertinent test results are summarized in Table II. The zeolite materials (catalysts) were also used in a hydrodealkylation of $C_9$+aromatic compounds. The results are also summarized in Table II.

TABLE II

| Catal[a] | Pretmt[b] | Time[c] (hr) | Temp (° C.) | % Conv $C_9$+ | % Conv[d] Naph | wt % $C_1$–$C_6$ | wt % Xyln's | Avg wt % Coke/hr[f] |
|---|---|---|---|---|---|---|---|---|
| A | None | 7.00 | 503 | 45.4 | 33.0 | 3.1 | 7.1 | 2.555 |
| B | AL | 7.28 | 497 | 78.1 | 78.1 | 13.2 | 24.0 | 2.250 |
| C | 425; AL | 6.69 | 499 | 80.3 | 83.8 | 14.7 | 24.0 | 1.20 |

[a]See catalyst designations in Example I.
[b]Pretreatment of beta zeolite with an acid (AL) or steam at temperatures indicated.
[c]Time of transalkylation reaction.
[d]Conversion of naphthalenes.

TABLE II-continued

| Catal[a] | Pretmt[b] | Time[c] (hr) | Temp (° C.) | % Conv $C_9+$ | % Conv[d] Naph | wt % $C_1-C_6$ | wt % Xyln's | Avg wt % Coke/hr[f] |
|---|---|---|---|---|---|---|---|---|

[e]Coke was determined at the end of the reaction by removing the catalysts from the reactor and determined with a thermal gravimetric analyzer (TGA), manufactured by TA Instruments, New Castle, Delaware.

The results shown in Table II demonstrate that a beta zeolite pre-treated with steam followed by acid-leaching before being impregnated with a metal compound significantly improved the conversion of $C_9+$aromatic compounds, including naphthalenes, to xylenes and significantly reduced the coke rate in a transalkylation process (comparing catalyst C with A). The results also show that acid-leaching a beta zeolite followed by impregnating a metal compound onto the acid-leached beta zeolite (catalyst B) also significantly improved the conversion of $C_9+$aromatic compounds to xylenes, though the reduction in coking rate was not as profound as catalyst C.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed:

1. A process consisting essentially of:
   (1) contacting a beta zeolite with steam at a temperature in the range of from about 200° C. to about 1000° to produce a steamed beta zeolite;
   (2) contacting said steamed beta zeolite with an aqueous solution containing an acid at a pH lower than about 6, at a temperature in the range of from about 30 to about 200° C., under about 1 to about 10 atm pressure, and for a period of from about 10 minutes to about 30 hours to produce an acid-leached Beta zeolite;
   (3) contacting said acid-leached beta zeolite with a metal compound thereby producing a metal-promoted beta zeolite by a method chosen from incorporating said metal into said acid-leached beta zeolite or impregnating said acid-leached beta zeolite with said metal;
   (4) calcining said metal -promoted beta zeolite wherein the metal of said compound is selected from the group consisting of nickel, palladium, molybdenum, gallium, platinum, tungsten, tin, indium, chromium, rhodium, rhenium, cobalt, germanium, zirconium, titanium, ruthenium, and combinations of any two or more thereof and said acid is selected from the group consisting of sulfuric acid, hydrochloric acid, nitric acid, phosphoric acid, formic acid, acetic acid, trifluoroacetic acid, trichloroacetic acid, p-toluenesulfonic acid, methanesulfonic acid, partially neutralized acids, and combinations of any two or more thereof.

2. A process according to claim 1 further comprising contacting said steamed beta zeolite with an acid thereby reducing the aluminum content of the beta zeolite to produce an acid-leached beta zeolite; and, thereafter, contacting said acid-leached beta zeolite with said metal compound to produce a metal-promoted beta zeolite.

3. A process according to claim 2 further comprising treating the metal-promoted beta zeolite with a reducing agent thereby lowering the oxidation state of said metal associated with the metal-promoted beta zeolite.

4. A process according to claim 2 wherein said acid is selected from nitric acid, hydrochloric acid, and combinations thereof.

5. A process according to claim 2 wherein the metal of said metal compound is molybdenum.

6. A process according to claim 2 wherein said metal compound is ammonium molybdate.

7. A process according to claim 1 further comprising treating the metal-promoted beta zeolite with a reducing agent thereby lowering the oxidation state of said metal associated with the metal-promoted beta zeolite.

8. A process according to claim 1 wherein said acid is selected from the group consisting of sulfuric acid, hydrochloric acid, nitric acid, phosphoric acid, formic acid, acetic acid, trifluoroacetic acid, trichloroacetic acid, p-toluenesulfonic acid, methanesulfonic acid, partially neutralized acids, and combinations of any two or more thereof.

9. A process consisting essentially of:
   (1) contacting a beta zeolite with steam thereby producing a beta zeolite having a reduced coking rate in a transalkylation process to produce a steamed beta zeolite;
   (2) contacting said steamed beta zeolite with an acid thereby reducing the aluminum content of said beta zeolite to produce an acid-leached beta zeolite; and (3) contacting said acid-leached beta zeolite with a metal compound thereby incorporating said metal compound into said acid-leached beta zeolite to produce a metal-promoted beta zeolite.

10. A process according to claim 9 further comprising contacting said metal-promoted beta zeolite with a reducing agent thereby lowering the oxidation state of said metal in the metal-promoted beta zeolite.

11. A process according to claim 10 wherein the metal of said metal compound is selected from the group consisting of nickel, palladium, molybdenum, gallium, platinum, tin, chromium, rhodium, rhenium, tungsten, indium, cobalt, germanium, zirconium, titanium, ruthenium, and combinations of any two or more thereof.

12. A process according to claim 10 wherein said metal compound is ammonium molybdate.

13. A process according to claim 9 wherein said acid is selected from the group consisting of sulfuric acid, hydrochloric acid, nitric acid, phosphoric acid, formic acid, acetic acid, trifluoroacetic acid, trichloroacetic acid, p-toluenesulfonic acid, methanesulfonic acid, partially neutralized acids, and combinations of any two or more thereof.

14. A process according to claim 9 wherein said acid is selected from the group consisting of nitric acid, hydrochloric acid, and combinations thereof.

15. A process according to claim 9 wherein the metal of said metal compound is selected from the group consisting of nickel, palladium, molybdenum, gallium, platinum, tin, chromium, rhodium, rhenium, tungsten, indium, cobalt, germanium, zirconium, titanium, ruthenium, and combinations of any two or more thereof.

16. A process according to claim 9 wherein the metal of said metal compound is molybdenum.

17. A process according to claim 9 wherein said metal compound is ammonium molybdate.

18. A process according to claim 9 wherein
   the metal of said metal compound is selected from the group consisting of nickel, palladium, molybdenum, gallium, platinum, tin, chromium, rhodium, rhenium, tungsten, indium, cobalt, germanium, zirconium, titanium, ruthenium, and combinations of any two or more thereof; and said acid is selected from the group consisting of sulfuric acid, hydrochloric acid, nitric acid, phosphoric acid, formic acid, acetic acid, trifluoroacetic acid, trichloroacetic acid, p-toluenesulfonic acid, methanesulfonic acid, partially neutralized acids, and combinations of any two or more thereof.

19. A process according to claim 18 further comprising treating said metal-promoted beta zeolite with a reducing agent thereby lowering the oxidation state of said metal in said metal-promoted beta zeolite.

20. A process according to claim 19 wherein said metal compound is ammonium molybdate.

21. A process according to claim 18 wherein said metal compound is ammonium molybdate.

22. A process consisting essentially of: (1) contacting a beta zeolite with steam at a temperature in the range of from 350 to 625° C. to produce a steamed beta zeolite; (2) contacting said steamed beta zeolite with an aqueous solution of hydrochloric acid or nitric acid at a temperature in the range of from about 70 to about 100° C., under about 1 to about 10 atm pressure, and for a period of from 1 to 20 hours to produce an acid-leached beta zeolite; (3) impregnating said acid-leached beta zeolite with an aqueous ammonium molybdate solution thereby producing a molybdenum-promoted beta zeolite; and (4) calcining said molybdenum-promoted beta zeolite at 450° C. to 650° C. for 2 to 15 hours.

* * * * *